Oct. 4, 1927.
B. TALBOT
LINED PIPE
Original Filed July 5, 1924
1,644,361
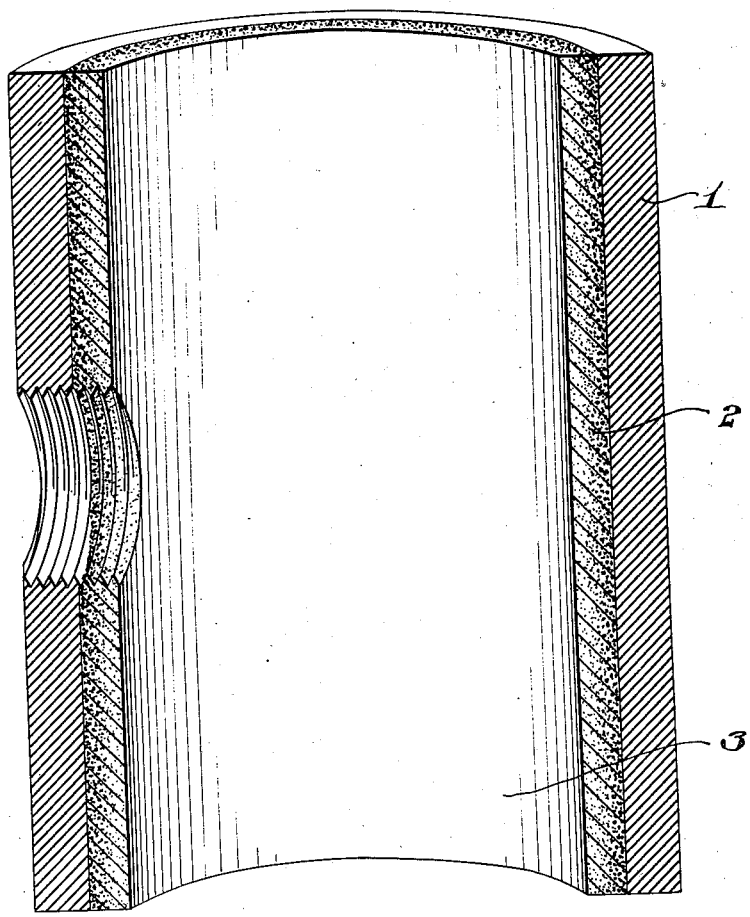
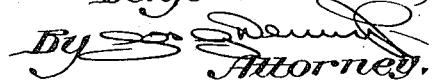

Patented Oct. 4, 1927.

1,644,361

UNITED STATES PATENT OFFICE.

BENJAMIN TALBOT, OF MIDDLESBROUGH, ENGLAND, ASSIGNOR TO TALBOT NON-CORROSIVE LININGS COMPANY, OF PHILADELPHIA, PENNSYLVANIA, A CORPORATION OF DELAWARE.

LINED PIPE.

Original application filed July 5, 1924, Serial No. 724,538, and in Great Britain July 31, 1923. Divided and this application filed September 14, 1925. Serial No. 56,391.

The present invention relates to the lining of metal pipes and other bodies of cylindrical bore by centrifugal action with tar, pitch, bitumen or other hydrocarbons which are solid at ordinary temperature, to protect them from rust, and so increase their length of time in service.

The principle of lining pipes by means of centrifugal action and also the making of concrete or cement pipes on the same principle is well known, and it has also been previously proposed to line concrete or cement pipes with bitumen.

In the lining of metal pipes in this manner with hydrocarbons as mentioned above it is not feasible for various reasons to have a lining of the desired thickness of the pure material used, whilst on the other hand, in many cases it is desirable that the surface at any rate of the lining should be of pure material.

To attain this result, instead of using the pure hydrocarbon or the like, solid at ordinary temperature, I mix with it a large proportion of reinforcing material, such as granite or other suitable material, ground to a sufficiently fine state. This mixture is heated so that the pitch or other hydrocarbon is in a fluid state and applied to the interior of the pipe to be lined by means of centrifugal action, and for the purpose of keeping the hydrocarbon mixture liquid whilst the lining is being spun, I heat the interior of the pipe to a sufficient temperature when necessary. The accompanying drawing is a section of pipe drawn on an exaggerated scale to illustrate the decrease in the percentage of solid material toward the inner surface in accordance with my invention.

I introduce the mixture preferably by mechanical means through a trough or otherwise, which spreads it over the length of the pipe 1 between the limits of the retaining rings usually provided at the two ends, and the centrifugal action results in the mixture being spread uniformly over the interior of the pipe and also has a further result that the ground granite or other suitable powdery reinforcing material 2, owing to its greater specific gravity, is forced to the outer surface of the lining, that is to say, the face of the lining next to the pipe, and the particles are bound together by the hydrocarbon 3. By revolving the pipe at a sufficient speed, the particles of reinforcing material are forced by centrifugal action towards the wall of the pipe, leaving on the exposed face of the lining a comparatively pure hydrocarbon surface, substantially free from reinforcing material. In this manner a lining of the desired thickness and with a smooth and comparatively pure hydrocarbon exposed surface is obtained at a considerably lower cost and of greater strength than if the entire lining were made of pure hydrocarbon by itself.

After the lining has been applied in this manner the whole is cooled to a suitable temperature whilst the pipe is still revolving, so that the inner exposed surface of hydrocarbon becomes sufficiently solid not to run when the centrifugal action ceases, and is of an even glossy surface, which is so desirable for the flow of water or other liquids. To effect this cooling of the lining it may be convenient to spray the outside of the steel pipe, when such is used, by means of water, preferably applied fairly equally by jets along its entire length, or the cooling may be effected by means of air drawn or forced through the interior of the pipe.

I have found that the hydrocarbon mixture can be varied within quite wide limits to suit the pipe to be lined. For the majority of cast iron, steel or other metallic pipes or the like I have found a mixture of bitumen, pitch and anthracene oil to give good results when intimately mixed with the reinforcing material. A small percentage of rosin, lime, sulphur, resin, etc. may advantageously be added, the lime tending to neutralize and saponify any tar acids present.

The effect of the addition of sulphur is to render the lining tougher and more flexible, so that for example if the hydrocarbon used is a bitumen of low melting point, the addition of sulphur raises the melting point and at the same time gives a product of greater flexibility than is usual with bitumens of a higher melting point.

The proportion of sulphur added is of the order of 10% of the amount of bitumen or other similar hydrocarbon but the precise proportion is dependent upon the character of the hydrocarbon. It is generally preferred to add the sulphur to the bitumen before the admixture of the latter with the powdered loading material, the sulphur and bitumen being maintained in a liquid condition preferably with constant agitation until the evolution of gas practically ceases and a considerable proportion of the sulphur has been given off. Alternatively the powdered loading material may be mixed with the bitumen before the addition of the sulphur or simultaneously therewith.

A suitable mixture of hydrocarbon and loading material is about 30 per cent of the former and 70 per cent of the latter, but this proportion and the degree of fineness of the powdered loading material may vary considerably, the fineness depending mainly on the thickness of the lining required, to determine which retaining rings of appropriate depth are provided at the ends of the tube.

When the pipes are not pre-heated, they are preferably dipped in melted hydrocarbon material at some time previous to the lining process.

I sometimes find it advantageous also to introduce the hydrocarbon mixture in more than one addition, the first and subsequent portions other than the last being more heavily loaded with powdered material and of a softer quality than the last lot which forms the exposed surface, this latter being preferably quite thin and composed largely of bitumen.

This application is a division of my application Serial No. 724,538, upon which Letters Patent of the United States No. 1,555,257, issued on September 29, 1925.

Having thus described the nature of the said invention and the best means I know of carrying the same into practical effect, I claim:—

1. As a new article of manufacture, a metallic body of cylindrical bore having an internal lining comprising a mixture of a hydrocarbon material and a powdery reinforcing material, the precentage of reinforcing material present in the lining increasing from its inner or exposed surface towards the surface in contact with the pipe.

2. As a new article of manufacture, a metallic body of cylindrical bore lined with a mixture of a hydrocarbon material and a powdery reenforcing material, the exposed surface of the said lining being smooth and glossy and comparatively free from the reenforcing material while the interior portion of the lining has a greater proportion of reenforcing material.

3. As a new article of manufacture, a metallic body of cylindrical bore having a lining consisting of a mixture of a hydrocarbon material and a powdery reenforcing material together with a relatively small percentage of sulphur, the exposed surface of the said lining being smooth and glossy and comparatively free from the reenforcing material.

4. As a new article of manufacture, a metallic body of cylindrical bore having an internal lining formed in a plurality of layers each comprising a mixture of a hydrocarbon material and a powdery reinforcing material in different proportions, the surface layer being composed largely of hydrocarbon material.

In testimony whereof I have signed my name to this specification.

BENJAMIN TALBOT.